United States Patent
Sarkar et al.

(10) Patent No.: US 10,324,473 B2
(45) Date of Patent: Jun. 18, 2019

(54) METHOD AND SYSTEM FOR GENERATING A SAFE NAVIGATION PATH FOR NAVIGATING A DRIVERLESS VEHICLE

(71) Applicant: WIPRO LIMITED, Bangalore (IN)

(72) Inventors: Manas Sarkar, Kolkata (IN); Balaji Sunil Kumar, Bengaluru (IN); Shyam Sundar Pal, Kolkata (IN)

(73) Assignee: Wipro Limited, Bangalore (IN)

( * ) Notice: Subject to any disclaimer, the term of this patent is extended or adjusted under 35 U.S.C. 154(b) by 46 days.

(21) Appl. No.: 15/654,756

(22) Filed: Jul. 20, 2017

(65) Prior Publication Data

US 2018/0348782 A1 Dec. 6, 2018

(30) Foreign Application Priority Data

Jun. 1, 2017 (IN) .............................. 201741019290

(51) Int. Cl.
*G05D 1/02* (2006.01)
*G01C 21/30* (2006.01)
(Continued)

(52) U.S. Cl.
CPC .......... *G05D 1/0238* (2013.01); *G01C 21/165* (2013.01); *G01C 21/3415* (2013.01);
(Continued)

(58) Field of Classification Search
CPC .......................... G05D 1/0238; G05D 1/0274; G05D 1/0278; G05D 2201/0212; G01C 21/165
See application file for complete search history.

(56) References Cited

U.S. PATENT DOCUMENTS 5,375,059 A * 12/1994 Kyrtsos .............. B60K 31/0008
342/357.24
5,612,883 A * 3/1997 Shaffer .............. B60K 31/0008
340/435
(Continued)

FOREIGN PATENT DOCUMENTS

DE 102013201941 A1 8/2014

OTHER PUBLICATIONS

Li, J, et al., "Real-time self-driving car navigation and obstacle avoidance using mobile 3D laser scanner and GNSS", Multimed Tools Applications 2017, vol. 76, No. 21, pp. 23017-23039.
(Continued)

*Primary Examiner* — Tyler J Lee
(74) *Attorney, Agent, or Firm* — Finnegan, Henderson, Farabow, Garrett & Dunner, LLP

(57) ABSTRACT

The present disclosure in the field of automobile engineering is a method and system for generating a safe navigation path for navigating a driverless vehicle. A path generating system receives one or more pre-generated paths between source point and destination point and an environmental data corresponding to each pre-generated path from one or more sources in real-time. Further, the path generating system identifies one or more navigation points in real-time based on the environmental data, vehicle capability characteristics and vehicle parameters by tracing virtual rays in a preconfigured angle range up to preconfigured distance from each of one or more originating points along each of the one or more pre-generated paths. Finally, the path generating system links the navigation points based on predefined techniques to generate the safe navigation path for navigating driverless vehicle. In the present disclosure, safe navigation path is generated without usage of any sensor.

19 Claims, 11 Drawing Sheets

(51) Int. Cl.
*G08G 1/16* (2006.01)
*G01C 21/34* (2006.01)
*G01C 21/16* (2006.01)

(52) U.S. Cl.
CPC ..... *G01C 21/3461* (2013.01); *G01C 21/3492* (2013.01); *G05D 1/0274* (2013.01); *G05D 1/0278* (2013.01); *G08G 1/165* (2013.01); *G05D 2201/0212* (2013.01)

(56) References Cited

U.S. PATENT DOCUMENTS

| | | | |
|---|---|---|---|
| 8,050,863 | B2 | 11/2011 | Trepagnier et al. |
| 9,227,632 | B1 | 1/2016 | Lee |
| 9,915,538 | B2* | 3/2018 | Fuehrer ................. G01C 21/34 |
| 2004/0158355 | A1* | 8/2004 | Holmqvist ........... G05D 1/0236 700/245 |
| 2008/0027591 | A1* | 1/2008 | Lenser ................ G05D 1/0251 701/2 |
| 2009/0287376 | A1* | 11/2009 | Aso ....................... B60W 10/12 701/42 |
| 2017/0176990 | A1* | 6/2017 | Keller ..................... G01S 17/42 |
| 2018/0107226 | A1* | 4/2018 | Yang ....................... G05D 1/042 |
| 2018/0120852 | A1* | 5/2018 | Cho ......................... B25J 9/162 |
| 2018/0141562 | A1* | 5/2018 | Singhal ................. G01S 13/862 |
| 2018/0164439 | A1* | 6/2018 | Droz ..................... G01S 17/102 |
| 2018/0164811 | A1* | 6/2018 | Yoo ....................... G05D 1/0278 |

OTHER PUBLICATIONS

Qu, P., et al., "A Constrained VFH Algorithm for Motion Planning of Autonomous Vehicles", IEEE 2015, pp. 700-705.
Extended European Search Report issued in the European Patent Office in counterpart European Application No. 17209089.6, dated Jul. 16, 2018, 9 pages.

* cited by examiner

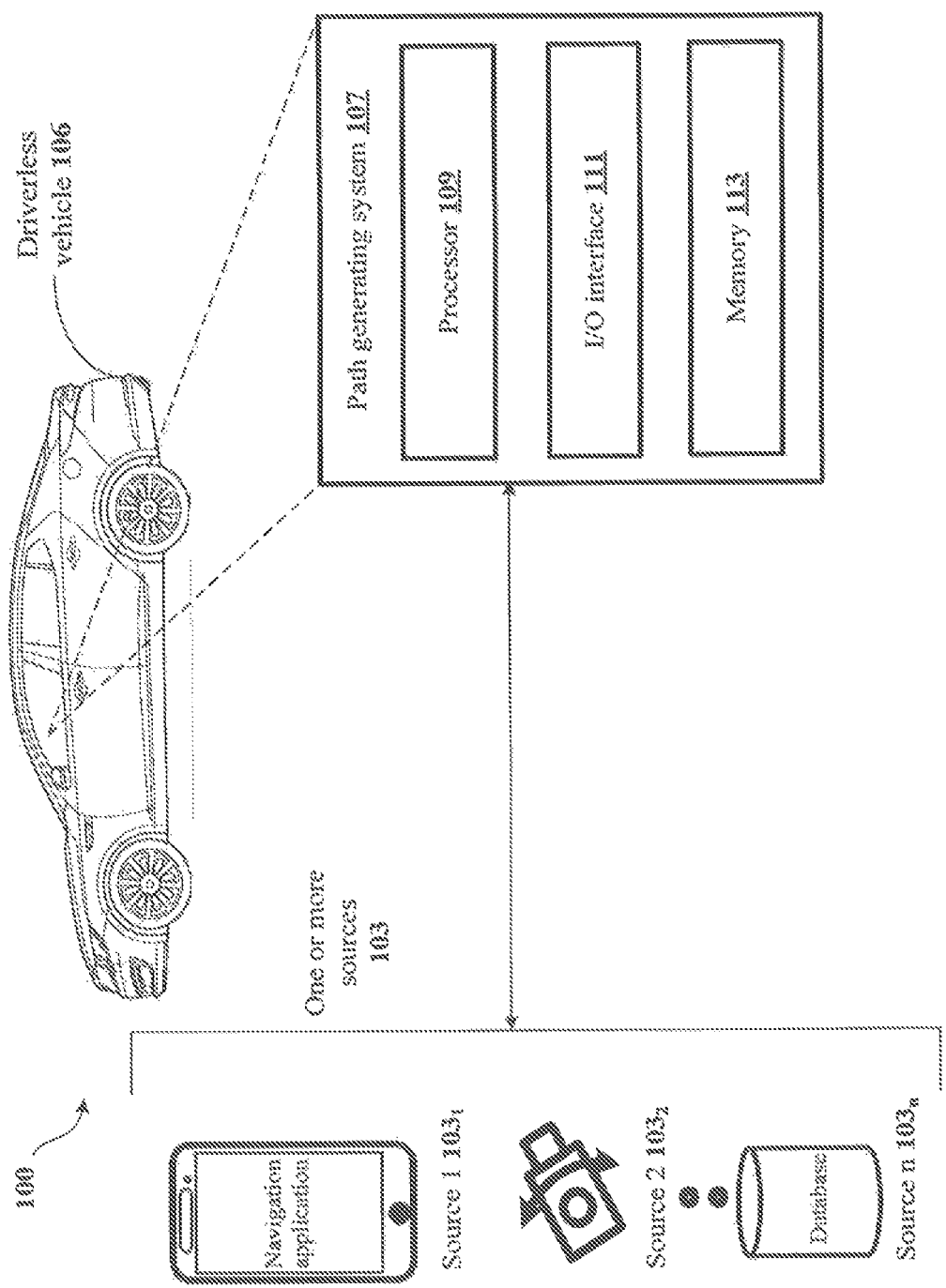

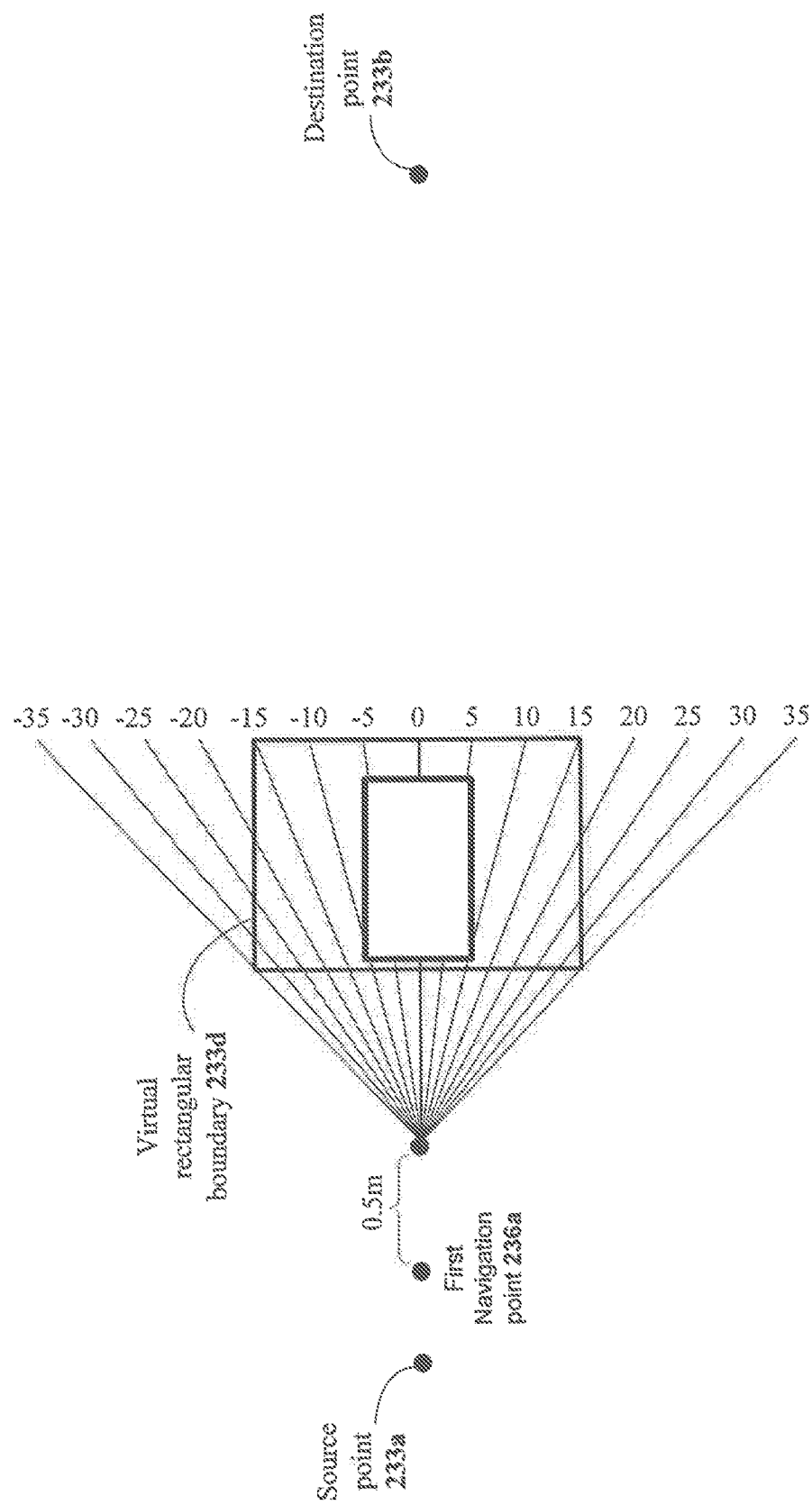

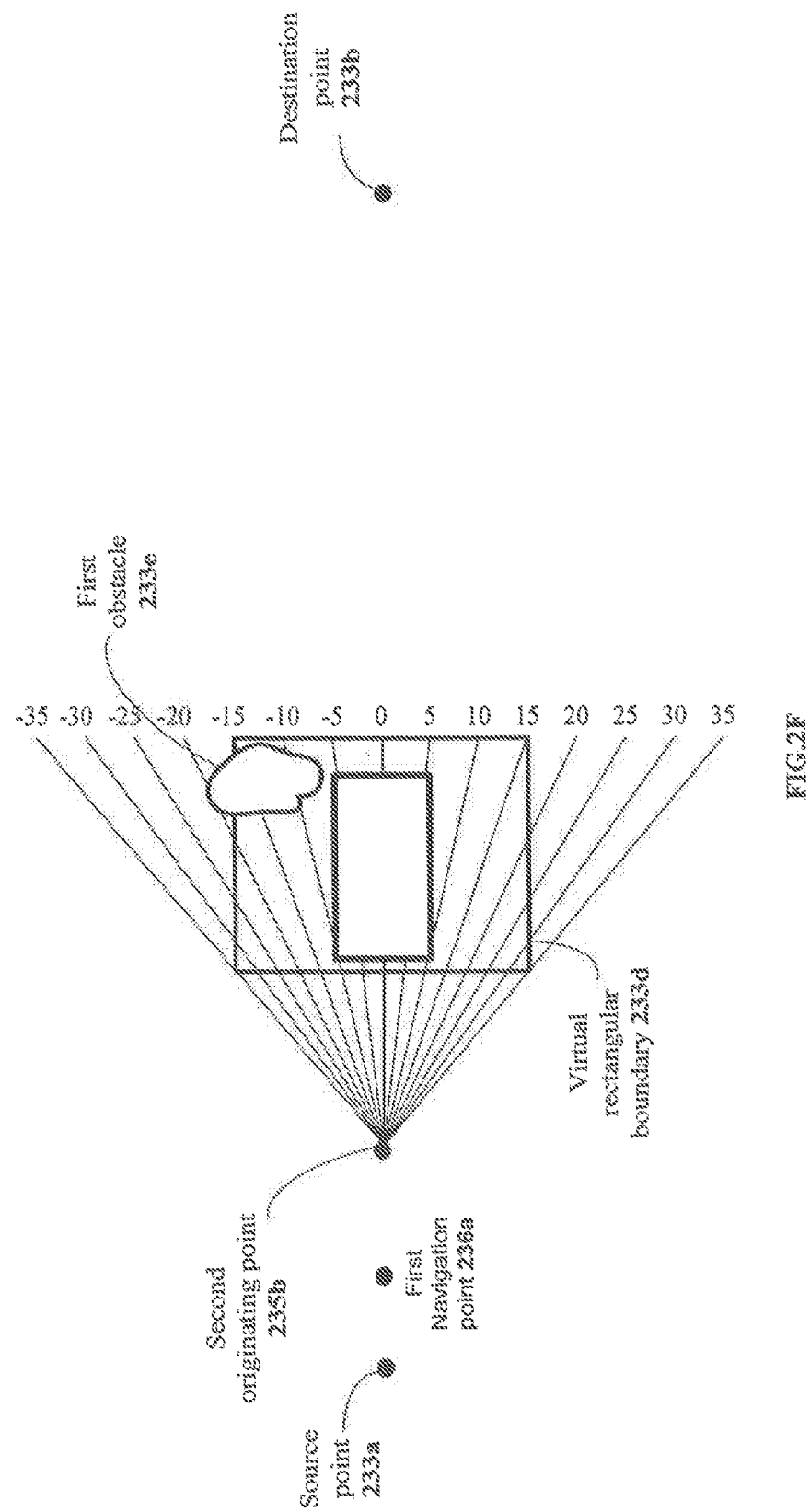

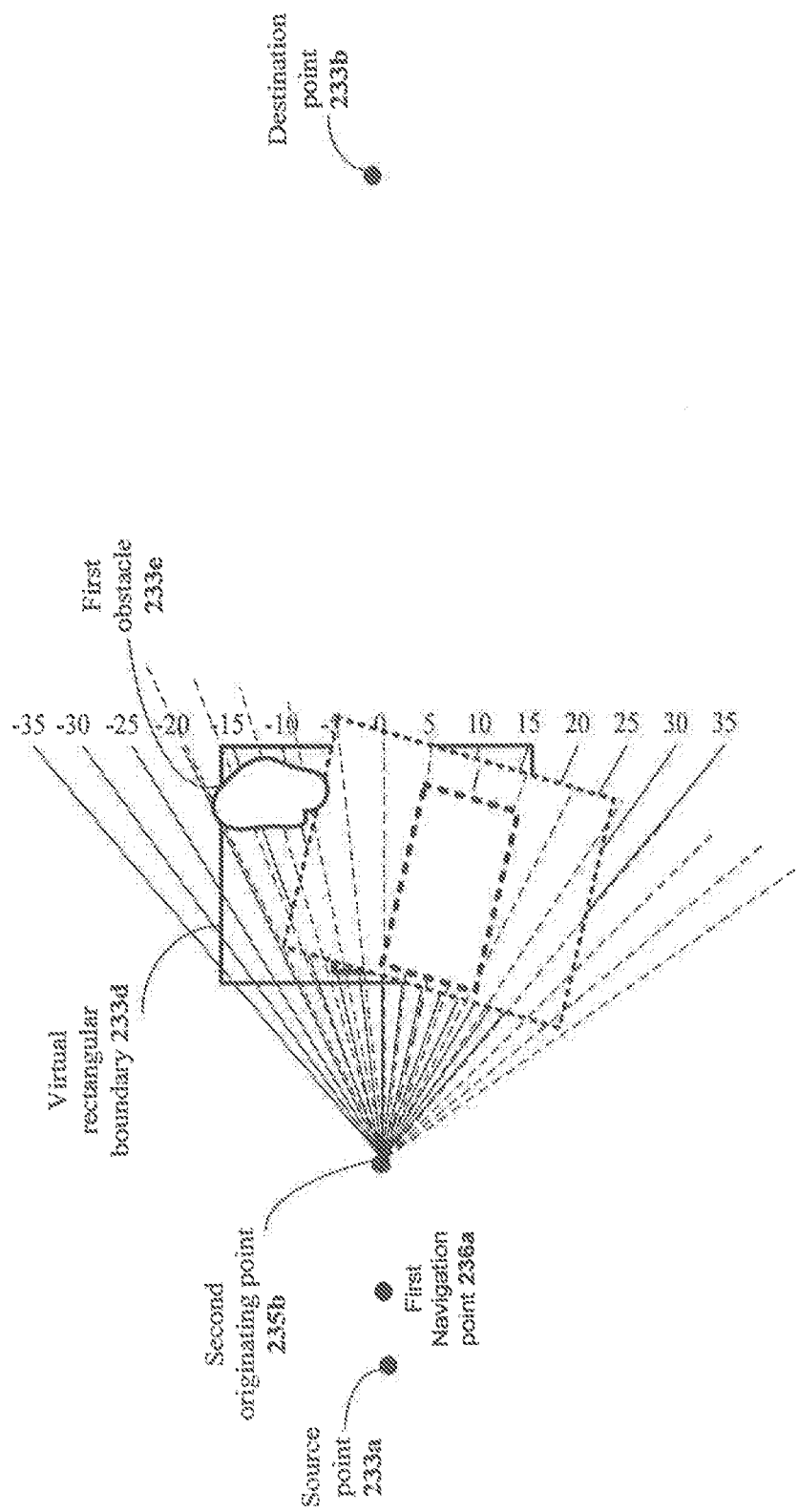

METHOD AND SYSTEM FOR GENERATING A SAFE NAVIGATION PATH FOR NAVIGATING A DRIVERLESS VEHICLE

TECHNICAL FIELD

The present subject matter relates generally to field of automobile engineering, and more particularly, but not exclusively to a method and a system for generating a safe navigation path for navigating a driverless vehicle.

BACKGROUND

Nowadays, navigating autonomous vehicle (AV)/driverless vehicle is becoming an important requirement in different application areas. AVs are the vehicles that are capable of sensing environment around them for moving on the road without any human intervention. The AV senses the environment with the help of sensors configured in the AV like Laser, Light Detection and Ranging (LIDAR), Global Positioning System (GPS), computer vision and the like. A control system associated with the AV may receive inputs from the sensors, based on which the control system may identify appropriate navigation path, obstacles in the dynamically changing environment and the like.

Generally, identifying the navigation path for the AV may include a combination of three basic abilities such as localization, path planning and vehicle control. Localization determines ability of the AV to calculate its current position and orientation within a global reference frame. Path planning determines path and sequence of command velocity to reach a desired destination from current position of the AV. The planned path may be followed by the AV using a feedback controller system which includes dynamic obstacle avoidance as well as global path pre-planning and/or re-planning.

Existing techniques for navigating the AV include classical planning, case based planning, coordinated robot planning and the like. However, for path planning, existing techniques only focus on either collision avoidance or shortest path between a source point and a destination point as a primary criterion. However, currently, there exists no mechanism to check whether the detected shortest path for navigating the driverless vehicle is a safe path or not. Further, the existing techniques use numerous sensors to navigate the AV that makes the overall system complex.

SUMMARY

One or more shortcomings of the prior art may be overcome and additional advantages may be provided through the present disclosure. Additional features and advantages may be realized through the techniques of the present disclosure. Other embodiments and aspects of the disclosure are described in detail herein and are considered a part of the claimed disclosure.

Disclosed herein is a method of generating a safe navigation path for navigating a driverless vehicle. The method comprises receiving, by a path generating system, one or more pre-generated paths between a source point and a destination point and an environmental data corresponding to each of the one or more pre-generated paths from one or more sources in real-time. Further, the path generating system identifies one or more navigation points in real-time based on the environmental data, one or more vehicle capability characteristics and one or more vehicle parameters by tracing virtual rays in a preconfigured angle range up to a preconfigured distance from each of one or more originating points along each of the one or more pre-generated paths. Finally, the path generating system links the one or more navigation points based on one or more predefined techniques to generate the appropriate navigation path for navigating the driverless vehicle.

Further, the present disclosure includes a path generating system for generating a safe navigation path for navigating a driverless vehicle. The path generating system comprises a processor and a memory communicatively coupled to the processor. The memory stores the processor-executable instructions, which, on execution, causes the processor to receive one or more pre-generated paths between a source point and a destination point and an environmental data corresponding to each of the one or more pre-generated paths from one or more sources. Further, the processor identifies one or more navigation points in real-time based on the environmental data, one or more vehicle capability characteristics and one or more vehicle parameters by tracing virtual rays in a preconfigured angle range up to a preconfigured distance from each of one or more originating points along each of the one or more pre-generated paths. Finally, the processor connects the one or more navigation points based on one or more predefined techniques to generate the appropriate navigation path for navigating the driverless vehicle.

Furthermore, the present disclosure comprises a non-transitory computer readable medium including instructions stored thereon that when processed by at least one processor causes a path generating system to perform operations comprising receiving one or more pre-generated paths between a source point and a destination point and an environmental data corresponding to each of the one or more pre-generated paths from one or more sources in real-time. Further, the instructions cause the processor to identify one or more navigation points in real-time based on the environmental data and one or more vehicle capability characteristics and one or more vehicle parameters by tracing virtual rays in a preconfigured angle range up to a preconfigured distance from each of one or more originating points along each of the one or more pre-generated paths. Finally, the instructions cause the processor to link the one or more navigation points based on one or more predefined techniques to generate the safe navigation path for navigating the driverless vehicle.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE ACCOMPANYING DIAGRAMS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIG. 1 shows an exemplary architecture for generating a safe navigation path for navigating a driverless vehicle in accordance with some embodiments of the present disclosure;

FIG. 2D-FIG. 2H shows an exemplary illustration for generating navigation points in accordance with some embodiments of the present disclosure;

Figure 2A:
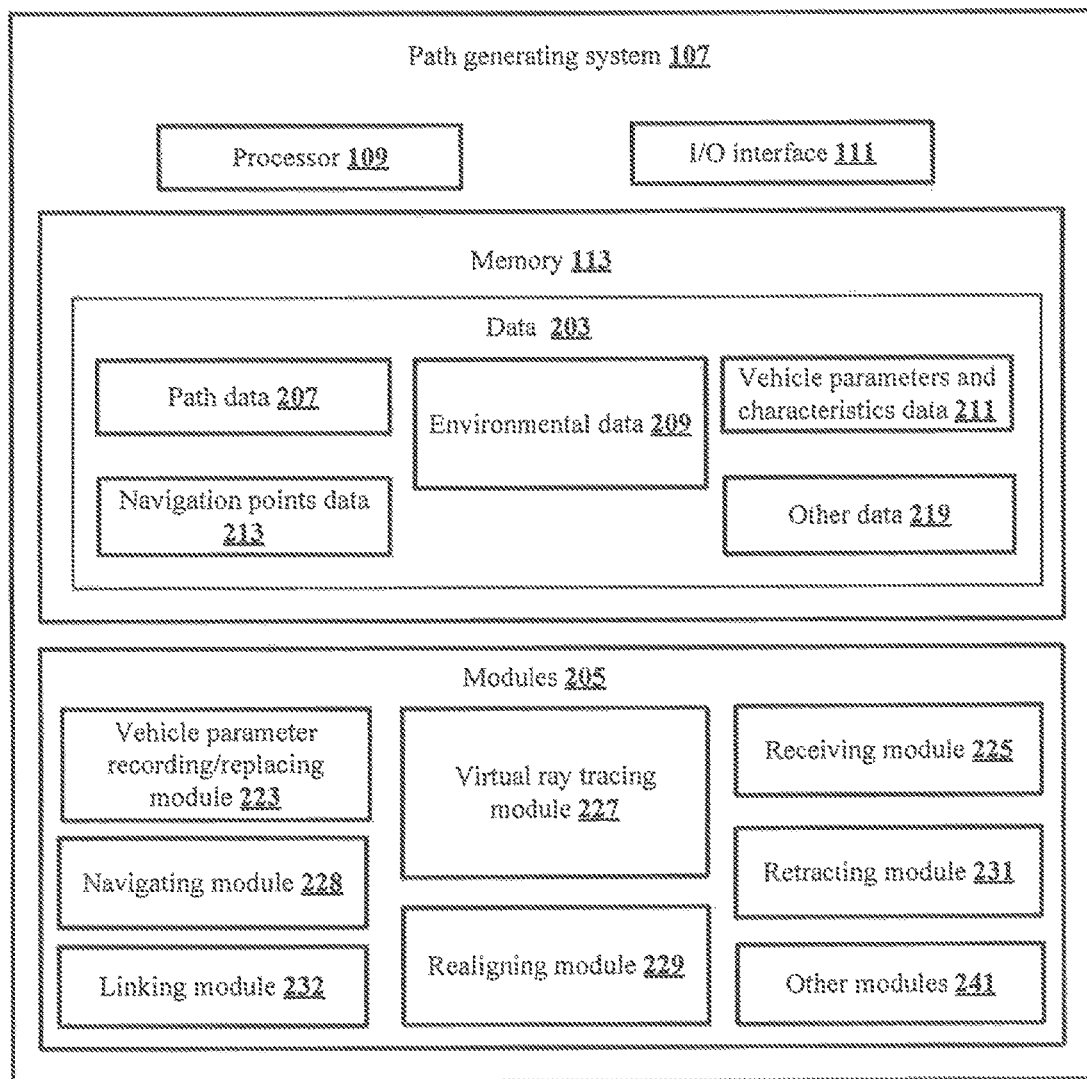
FIG. 2A shows a detailed block diagram of a path generating system for generating a safe navigation path for navigating a driverless vehicle in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the forms disclosed, but on the contrary, the disclosure is to cover all modifications, equivalents, and alternative falling within the scope of the disclosure.

The terms "comprises", "comprising", "includes" or any other variations thereof, are intended to cover a non-exclusive inclusion, such that a setup, device or method that includes a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Disclosed herein are a method and a path generating system for generating a safe navigation path for navigating a driverless vehicle. The present disclosure provides a feature wherein the safe navigation path is generated considering vehicle parameters such as possible rate of change of steering angle at various speeds, turning radius, static inertia or dynamic inertia of the driverless vehicle and the like. Initially the path generating system may receive one or more pre-generated paths between a source point and a destination point and an environmental data corresponding to each of the one or more pre-generated paths from one or more sources. As an example, the one or more sources may be a navigation application, application related to maps, an image capturing device, a database and the like. The environmental data may include data related to terrain associated with each of the one or more pre-generated paths and one or more obstacles associated with each of the one or more pre-generated paths. As an example, the one or more obstacles may be a speed breaker, a rock, a branch of a tree fallen on the road, vehicles on the road, workers working on the road and the like. Upon obtaining the one or more pre-generated paths and the environmental data corresponding to each of the one or more pre-generated paths, the path generating system may select an originating point on each of the one or more pre-generated paths. Upon selecting the originating point, the path generating system may trace virtual rays from the originating point in a preconfigured angle range up to a preconfigured distance along each of the one or more pre-generated paths.

The path generating system may identify one or more navigation points in real-time based on the environmental data, one or more vehicle capability characteristics and one or more vehicle parameters when the virtual rays do not hit the one or more obstacles. Upon obtaining the navigation points from the originating point, the path generating system virtually moves the driverless vehicle forward for a certain distance and obtains one or more originating points for tracing the virtual rays until the destination point is reached. If the virtual rays hit the one or more obstacles, the path generating system may identify the one or more navigation points in real-time by realigning position of the traced virtual rays from the originating point in different angles until the traced virtual rays escape the one or more obstacles. The position of the traced virtual rays is realigned when the one or more obstacles are present at a preconfigured angle of the traced virtual rays and in a corresponding preconfigured alignment distance range from the originating point. The corresponding preconfigured alignment distance range is selected for each of the preconfigured angle based on one or more vehicle parameters and one or more vehicle capability characteristics. If the one or more obstacles occurring at a certain preconfigured angle are beyond the preconfigured alignment distance range corresponding to the preconfigured angle, the originating point may be considered as the navigation point and moves forward for the pre-configured forward distance without any re-alignment. The preconfigured angle is within the preconfigured angle range and the corresponding preconfigured alignment distance range is within the preconfigured distance.

Further, when the path generating system is unable to identify the one or more navigation points from the originating point, the path generating system may retract from the originating point and select an alternative originating point. As an example, the retraction of the driverless vehicle may include retracting from current originating point to previous navigation point or discarding one or more previous navigation points. Finally, upon obtaining the one or more navigation points, the path generating system may link the one or more navigation points based on one or more predefined techniques to generate the safe navigation path for navigating the driverless vehicle. As an example, the one or more predefined techniques may be a curve fitting technique. In the present disclosure, the safe navigation path is generated without the use of any sensor configured in the driverless vehicle.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1 shows an exemplary architecture for generating a safe navigation path for navigating a driverless vehicle in accordance with some embodiments of the present disclosure.

The architecture 100 includes one or more sources, source 1 $103_1$ to source n $103_n$ (collectively referred to as one or more sources 103), a driverless vehicle 106 and a path generating system 107. As an example, the one or more sources 103 may be a navigation application, application related to maps, an image capturing device, a terrain detection system, a database and the like. The one or more sources 103 such as the navigation application and application related to maps provide one or more pre-generated paths between a source point and a destination point. As an example, the one or more pre-generated paths may be obtained using Dijkstra's algorithm, A-star algorithm and the like. In some embodiments, the source point and the destination point may be provided as inputs to the path generating system 107 by a user associated with the path generating system 107. Further, the one or more sources 103 such as the image capturing device, the terrain detection system and the database may provide environmental data. As an example, the environmental data may include, but not limited to, data related to terrain associated with each of the one or more pre-generated paths and one or more obstacles in each of the one or more pre-generated paths. In some embodiments, the one or more obstacles may be any items that hinder movement of a driverless vehicle. As an example, the one or more obstacles may be a deviation barrier, a rock, a branch of a tree fallen on a road, vehicles on the road, workers working on the road, animals and the like. The one or more sources 103 may be associated with the path generating system 107 via a communication network (not shown in FIG. 1). As an example, the communication network may be a wired communication network or a wireless communication network.

In some embodiments, the path generating system 107 may be configured within the driverless vehicle 106. The path generating system 107 may include a processor 109, an Input/Output (I/O) interface 111 and a memory 113. The I/O interface 111 may receive the pre-generated map and the environmental data from the one or more sources 103. Upon receiving, the one or more pre-generated paths and the environmental data, the processor 109 may select one or more originating points along each of the one or more pre-generated paths starting from the source point. Upon selecting the one or more originating points, the processor 109 may trace virtual rays from each of the one or more originating points in a preconfigured angle range up to a preconfigured distance along the pre-generated map. The processor 109 may identify one or more navigation points from each of the one or more originating points based on the environmental data, one or more vehicle capability characteristics and one or more vehicle parameters when the virtual rays do not hit the one or more obstacles. As an example, the one or more vehicle capability characteristics may include, but not limited to, possible rate of change of steering angle at various speeds, turning radius, static inertia and dynamic inertia of the driverless vehicle 106. As an example, the vehicle parameters may include, but not limited to, dimensions, mass and wheel friction of the driverless vehicle 106.

In some embodiments, values associated with the one or more vehicle capability characteristics and the one or more vehicle parameters may be pre-recorded and stored in the memory 113. The processor 109 may record new set of values associated with the one or more vehicle capability characteristics and the one or more vehicle parameters when the driverless vehicle 106 is initiated. The recorded new set of values are compared with the predefined values to identify presence of any deviation in the pre-recorded values and the newly recorded values. If the processor 109 identifies the deviation, then the pre-recorded values are replaced with the newly recorded values. If the processor 109 identifies no deviation, then the pre-recorded values are retained.

When the virtual rays traced from each of the one or more originating points do not hit the one or more obstacles, the processor 109 may identify each originating point as the navigation point in real-time. Upon obtaining the navigation points from each of the one or more originating points, the processor 109 may virtually move the driverless vehicle 106 forward for a certain distance to obtain subsequent originating points. The certain distance may be either preconfigured forward distance or dynamically generated forward distance. In some embodiments, if the virtual rays traced from an originating point hit the one or more obstacles, the processor 109 may realign position of the virtual rays from the originating point in different angles until the virtual rays escape the one or more obstacles. The position of the traced virtual rays is realigned when the one or more obstacles are present at a preconfigured angle of the traced virtual rays and in a corresponding preconfigured alignment distance range from the originating point. The preconfigured angle is within the preconfigured angle range and the corresponding preconfigured alignment distance range is within the preconfigured distance. The corresponding preconfigured alignment distance range is selected for each of the preconfigured angle based on one or more vehicle parameters and one or more vehicle capability characteristics. If the one or more obstacles occurring at a certain preconfigured angle are beyond the preconfigured alignment distance range corresponding to the preconfigured angle, the originating point may be considered as the navigation point and moves forward for the preconfigured forward distance without any re-alignment. Further, when the processor 109 is unable to identify the one or more navigation points from the originating point, the processor 109 may virtually retract from the originating point. In some embodiments, retraction may include retracting from the originating point to previous navigation point. In some embodiments, retraction of the driverless vehicle 106 may include discarding one or more previous navigation points and selecting an alternative originating point for tracing virtual rays.

Finally, upon obtaining the one or more navigation points, the processor 109 may link the one or more navigation points based on one or more predefined techniques to generate a safe navigation path for navigating the driverless vehicle 106. As an example, the one or more predefined techniques may be a curve fitting technique.

FIG. 2A shows a detailed block diagram of a path generating system for generating a safe navigation path for navigating a driverless vehicle in accordance with some embodiments of the present disclosure.

In some implementations, the path generating system 107 may include data 203 and modules 205. As an example, the data 203 is stored in the memory 113 configured in the path generating system 107 as shown in the FIG. 2A. In one embodiment, the data 203 may include path data 207, environmental data 209, vehicle parameters and characteristics data 211, navigation points data 213 and other data 219. In the illustrated FIG. 2A, modules 205 are described herein in detail.

In some embodiments, the data 203 may be stored in the memory 113 in form of various data structures. Additionally, the data 203 can be organized using data models, such as relational or hierarchical data models. The other data 219 may be store data, including temporary data and temporary files, generated by the modules 205 for performing the various functions of the path generating system 107.

In some embodiments, the data 203 stored in the memory 113 may be processed by the modules 205 of the path generating system 107. The modules 205 may be stored within the memory 113. In an example, the modules 205 communicatively coupled to a processor 109 configured in the path generating system 107, may also be present outside the memory 113 as shown in FIG. 2A and implemented as hardware. As used herein, the term modules refer to an application specific integrated circuit (ASIC), an electronic circuit, a processor (shared, dedicated, or group) and memory that execute one or more software or firmware programs, a combinational logic circuit, and/or other suitable components that provide the described functionality.

In an embodiment, the modules 205 may include, for example, a vehicle parameter recording/replacing module 223, a receiving module 225, a virtual ray tracing module 227, a navigating module 228, a realigning module 229, a retracting module 231, a linking module 232 and other modules 241. The other modules 241 may be used to perform various miscellaneous functionalities of the path generating system 107. It will be appreciated that such aforementioned modules 205 may be represented as a single module or a combination of different modules.

In some embodiments, the vehicle parameter recording/ replacing module 223 may record values associated with one or more vehicle parameters and values associated with one or more vehicle capability characteristics when a driverless vehicle 106 is initiated. As an example, the one or more vehicle capability characteristics may include, but not limited to, possible rate of change of steering angle at different speeds, turning radius, static inertia and dynamic inertia of the driverless vehicle 106. As an example, the vehicle parameters may include, but not limited to, dimensions, mass and wheel friction of the driverless vehicle 106. The values associated with one or more vehicle parameters and values associated with one or more vehicle capability characteristics may be stored as the vehicle parameters and characteristics data 211. In some embodiments, the values associated with the one or more vehicle capability characteristics and the one or more vehicle parameters may be pre-recorded and stored in the memory 113. The vehicle parameter recording/replacing module 223 may record new set of values associated with the one or more vehicle capability characteristics and the one or more vehicle parameters when the driverless vehicle 106 is initiated. Further, the vehicle parameter recording/replacing module 223 may compare the recorded new set of values with the pre-recorded values to detect deviation in the pre-recorded values and the newly recorded values. The vehicle parameter recording/replacing module 223 may replace the pre-recorded values with the newly recorded values when the deviation is detected. If the deviation is not detected, the vehicle parameter recording/replacing module 223 may retain the pre-recorded values. In some embodiments, the one or more vehicle parameters and the one or more vehicle capability characteristics whose values should be recorded at initiation may be pre-configured.

The one or more vehicle parameters and the one or more vehicle capability characteristics may assist in determining location and direction of the driverless vehicle 106 in real-time.

In some embodiments, the receiving module 225 may receive one or more pre-generated paths between a source point and a destination point in real-time from one or more sources 103. As an example, the one or more sources 103 may be a navigation application, application related to maps, an image capturing device, a terrain detection system, a database and the like. The one or more pre-generated paths may be stored as the path data 207. In some embodiments, the source point and the destination point may be pre-configured by a user associated with the path generating system 107. Further, the receiving module 225 may receive an environmental data 209 corresponding to each of the one or more pre-generated paths from the one or more sources 103 in real-time. In some embodiments, the environmental data 209 may include, but not limited to, data related to terrain associated with each of the one or more pre-generated paths and one or more obstacles associated with each of the one or more pre-generated paths. In some embodiments, the one or more obstacles may be any items that hinder movement of a driverless vehicle. As an example, the one or more obstacles may be a deviation barrier, a rock, a branch of a tree fallen on a road, vehicles on the road, workers working on the road, animals and the like. In some embodiments, the receiving module 225 may receive the one or more pre-generated paths and the environmental data 209 corresponding to each of the one or more pre-generated paths at pre-configured time intervals. As an example, the pre-configured time intervals may be 300 milli seconds (ms), 250 ms and the like.

In some embodiments, the virtual ray tracing module 227 may trace virtual rays to detect possibility of the driverless vehicle 106 hitting the one or more obstacles. Initially, the virtual ray tracing module 227 may select one or more originating points along each of the one or more pre-generated paths. In some embodiments, the one or more originating points may be selected one at a time. The virtual ray tracing mechanism is explained below with respect to one originating point and one pre-generated path at a given point of time. In some embodiments, the virtual ray tracing module 227 may trace virtual rays from the originating point in a preconfigured angle range up to a preconfigured distance along the pre-generated path as shown in the FIG. 2B. In some embodiments, the virtual ray tracing module 227 may create a virtual rectangular boundary 233d around the driverless vehicle 106 based on the one or more vehicle parameters such as the dimensions of the driverless vehicle 106. One edge of the virtual rectangular boundary 233d may align with the end points of the virtual rays as shown in the FIG. 2B. Upon tracing the virtual rays, the virtual ray tracing module 227 may check if the virtual rays are hitting the one or more obstacles i.e. whether the imaginary rectangular boundary is touching the one or more obstacles. If the virtual rays are not hitting the one or more obstacles, the virtual ray tracing module 227 may check if the driverless vehicle 106 is capable of proceeding forward along direction of the virtual rays based on the one or more vehicle parameters, the one or more vehicle capability characteristics and the terrain condition of the environment data 209. As an example, if the terrain condition is rocky and if the driverless vehicle 106 is not built well to move in the rocky terrain condition then the virtual ray tracing module 227 may activate the realigning module 229 or the retracting module 231 dynamically as per requirement. If the driverless vehicle 106 is capable of proceeding forward along the direction of the virtual rays, the virtual ray tracing module 227 may identify the originating point as a navigation point. In some embodiments, the one or more pre-generated paths may be considered as a base path/a guide while selecting the navigation points. The navigation point may be stored as the navigation points data 213. In some embodiments, upon identifying the navigation point, the navigating module 228 may navigate the driverless vehicle 106 up to a certain forward distance. In some embodiments, the certain forward distance may be the distance between the navigation point and a subsequent originating point. In some embodiments, the forward distance is either a pre-configured forward distance or a dynamically generated forward distance. Upon moving via the certain forward distance, subsequent originating points are selected for tracing the virtual rays and also subsequent navigation points may be obtained. Further, if the virtual rays are detected to be hitting the one or more obstacles, the virtual ray tracing module 227 may activate the realigning module 229 or the retracting module 231 as per requirement.

Figure 2B:
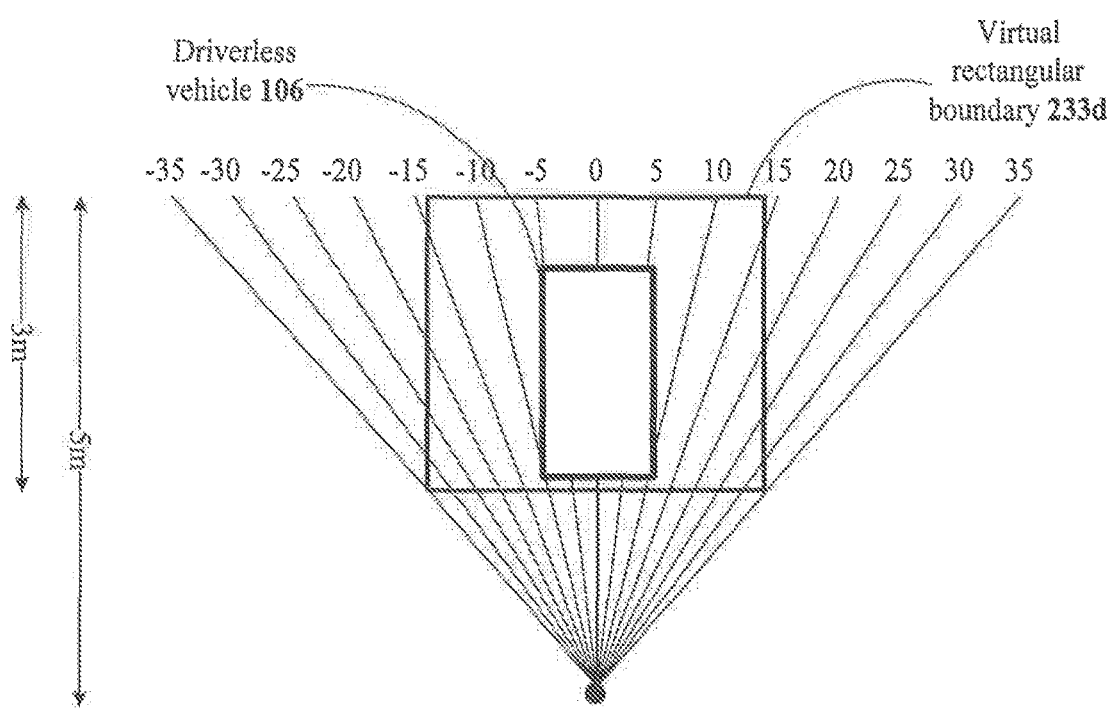
FIG. 2B-FIG. 2C shows an exemplary illustration of tracing virtual rays along with a virtual rectangular boundary in accordance with some embodiments of the present disclosure.

In some embodiments, the realigning module 229 may be activated when the one or more obstacles are present at a preconfigured angle of the traced virtual rays and in a corresponding preconfigured alignment distance range from the originating point, wherein the corresponding preconfigured alignment distance range is selected for each of the preconfigured angle based on one or more vehicle parameters and one or more vehicle capability characteristics. The preconfigured angle lies within the preconfigured angle range. As an example, the preconfigured angle range shown in the FIG. 2B is −35 to +35. In the FIG. 2B, the driverless vehicle 106 is represented within the virtual rectangular boundary 233d. Further, the preconfigured alignment distance range is the distance starting from the originating point that lies within the preconfigured distance up to the end of the virtual rectangular boundary 233d, which varies with the preconfigured angle of each virtual ray. The lower virtual rectangular boundary 233d is not allowed to hit the one or more obstacles at any point of ray-tracing process. As an example, the preconfigured alignment distance range may be from 0 meter to 3.5 meter for the virtual ray at the preconfigured angle of −25 degree. Consider the one or more obstacles are present at the virtual ray of the preconfigured angle −25 degree. If these one or more obstacles are present beyond the preconfigured alignment distance range of 0 meter-3.5 meter, the one or more obstacles may not be a threat to the driverless vehicle 106 and the originating point may be considered as the navigation point. Further, the driverless vehicle 106 moves forward for the certain preconfigured forward distance without any re-alignment of the position of the traced virtual rays.

Figure 2C:
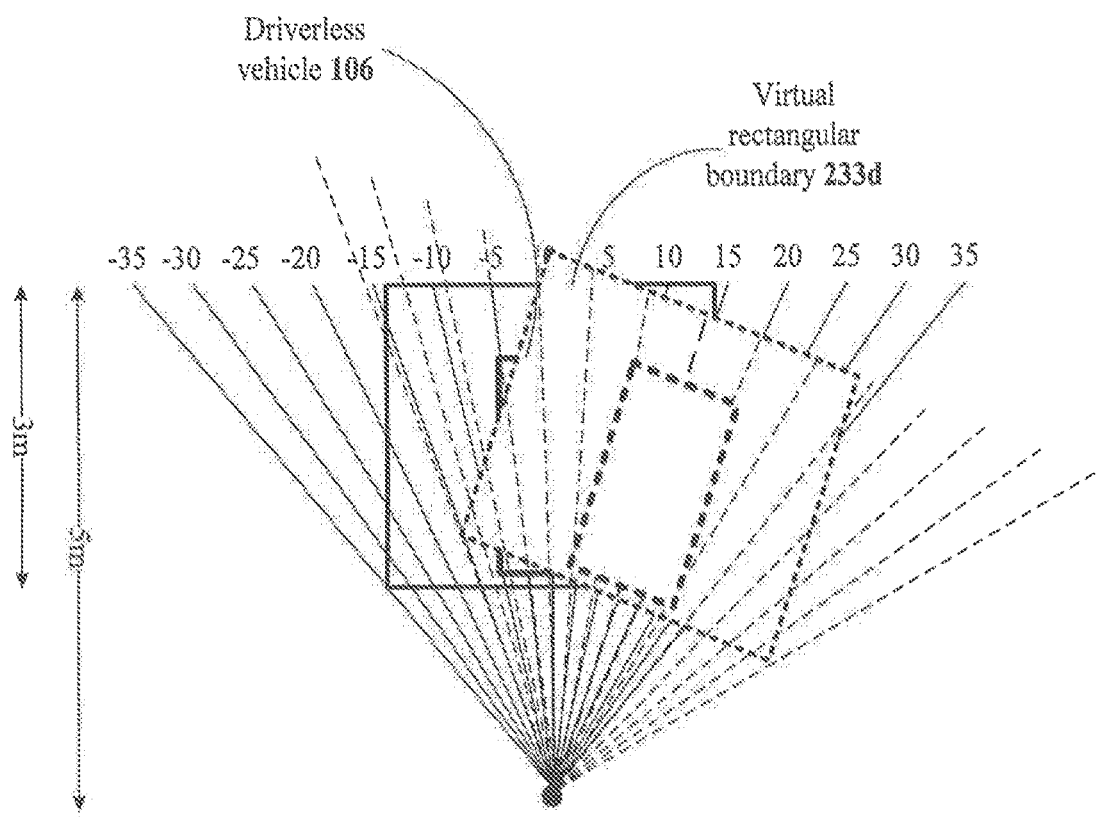

In some embodiments, the realigning module 229 may realign position of the traced virtual rays from the originating point in different angles as shown in the FIG. 2C. In some embodiments, realigning the position of the traced virtual rays may be performed with one different angle at a time until a realigning condition is satisfied. In some embodiments, the realigning condition to be satisfied may be escaping the one or more obstacles. In some embodiments, the realigning condition to be satisfied may be detecting the position of the virtual ray that does not hit the one or more obstacles and along the direction of which the driverless vehicle 106 is capable of proceeding forward. Further, the different angles are either preconfigured or dynamically generated based on the one or more vehicle parameters and the one or more vehicle capability characteristics. Therefore, upon realigning the position of the traced virtual rays for each different angle, the realigning module 229 may check the realigning condition. If the realigning module 229 detects that the realigning condition is satisfied, the originating point may be identified as the navigation point and the navigating module 228 may navigate the driverless vehicle 106 up to the certain forward distance. If the realigning module 229 detects that the realigning condition is not satisfied for any of the different angles, the retracting module 231 may be activated.

In some embodiments, the retracting module 231 may retract from the originating point and select an alternative originating point when the virtual ray tracing module 227 and the realigning module 229 fail to identify the one or more navigation points from the originating point. In some embodiments, retraction of the driverless vehicle 106 may include retracting from the originating point to a previous navigation point. In some embodiments, retraction of the driverless vehicle 106 may include discarding one or more previous navigation points. The retracting module 231 may decide on number of the one or more navigation points to be discarded based on the one or more vehicle parameters and the one or more vehicle capability characteristics. Upon retracting from the originating point, an alternative originating point may be selected for tracing the virtual rays.

The procedure explained in the above modules to identify the one or more navigation points is repeated for each of the one or more originating points in each of the one or more pre-generated paths until the destination point is reached.

In some embodiments, the linking module 232 may link the one or more navigation points based on one or more predefined techniques to generate a safe navigation path for navigating the driverless vehicle 106. As an example, the one or more predefined techniques may be a curve fitting technique. In some embodiments, linking of the one or more navigation points may include generating interpolated points between consecutive navigation points.

Consider an exemplary scenario as shown in FIG. 2D-FIG. 2G where the method of tracing the virtual rays to generate the safe navigation path is illustrated.

Figure 2D:
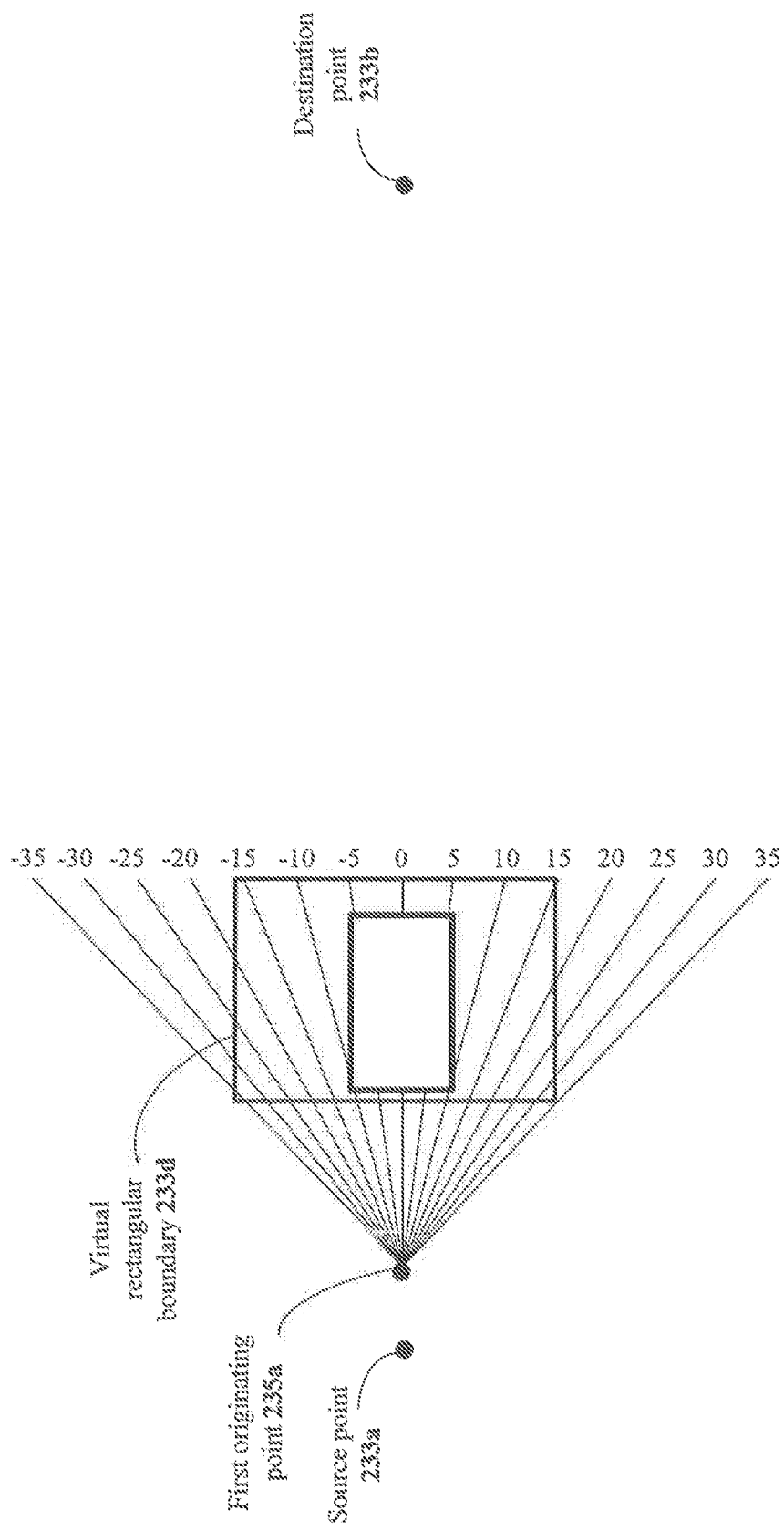

In FIG. 2D, point 233a indicates a source point and point 233b indicates the destination point. Initially, point 235a may be selected as the originating point. The virtual ray tracing module 227 may trace the virtual rays in an angle range of +35 to −35 degree and up to a distance of 5 meter from the first originating point 235a. End points of the traced virtual rays may be aligned with a virtual rectangular boundary 233d. The virtual ray tracing module 227 may check if any of the traced virtual rays beyond its corresponding preconfigured alignment distance range hits the one or more obstacles. The virtual ray tracing module 227 may detect that the traced virtual rays do not hit the one or more obstacles. Further, the virtual ray tracing module 227 may check if the driverless vehicle 106 is capable of proceeding forward along direction of the virtual rays based on the one or more vehicle parameters, the one or more vehicle capability characteristics and the terrain condition of the environment data 209. Consider that the terrain condition in which the driverless vehicle 106 is moving is a highway. The virtual ray tracing module 227 may detect that the driverless vehicle 106 is capable of proceeding forward on the highway based on the one or more vehicle parameters and the one or more vehicle capability characteristics such as wheel friction, mass of the driverless vehicle 106 and the like. Therefore, the virtual ray tracing module 227 identifies the first originating point 235*a* as a navigation point 236*a* (as shown in the FIG. 2E). Upon identifying the navigation point 236*a*, the navigating module 228 may navigate the driverless vehicle 106 to a certain pre-configured forward distance, for example 0.5 meter as shown in the FIG. 2E. Meanwhile, a new pre-generated path is received along with new environment data 209 which is dynamically updated in the path generating system 107. Upon moving forward, point 235*b* is selected as the second originating point as shown in the FIG. 2F.

With reference to FIG. 2F, the virtual ray tracing module 227 may trace the virtual rays in an angle range of +35 to −35 degree and up to a distance of 5 meter from the second originating point 235*b*. End points of the traced virtual rays may be aligned with a virtual rectangular boundary 233*d*. The virtual ray tracing module 227 may check if any of the traced virtual rays beyond its corresponding preconfigured alignment distance range hits the one or more obstacles. The virtual ray tracing module 227 may detect a first obstacle 233*e* at a virtual ray of preconfigured angle −10 degree and at a distance of 3.5 meter from the second originating point 235*b*. Consider the preconfigured alignment distance range for the virtual ray at the preconfigured angle −10 degree is 0 meter to 4.5 meter. The first obstacle 233*e* is well within the preconfigured alignment distance range of 0 meter to 4.5 meter. Therefore, the realigning module 229 may realign position of the traced virtual rays to escape the first obstacle 233*e*. The angle for realigning the position of the traced virtual rays is selected based on the one or more vehicle parameters and the one or more vehicle capability characteristics. Consider the dimensions of the driverless vehicle 106 may be length "X" meter, width "Y" meter and height "Z" meter. Further, the wheel friction may be "F" units and the possible rate of change of steering angle is "R" units.

Figure 2H:
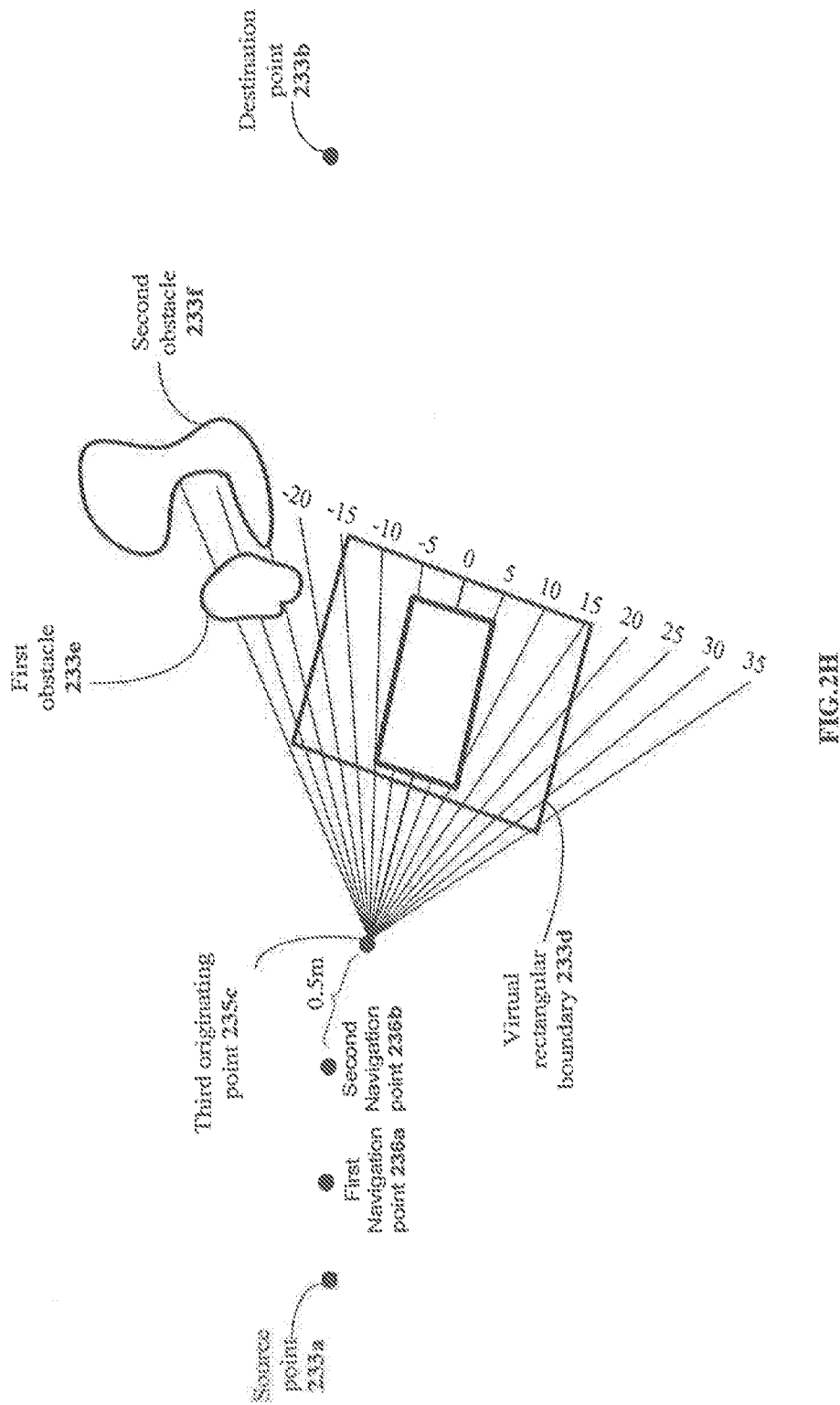

Based on one or more vehicle parameters and the one or more vehicle capability characteristics, the realigning module 229 may select the angle for realigning as "+11 degree" and realigns the position of the traced virtual rays by +11 degree as shown in the FIG. 2G. Upon realigning, the first obstacle 233*e* may be present at a new preconfigured angle. The realigning module 229 checks if the first obstacle 233*e* still lies within a new preconfigured alignment distance range corresponding to the new preconfigured angle. Considering the first obstacle 233*e* lies beyond the new preconfigured alignment distance range, the virtual ray tracing module 227 may check if the driverless vehicle 106 is capable of proceeding forward along direction of the virtual rays based on the one or more vehicle parameters, the one or more vehicle capability characteristics and the terrain condition of the environment data 209. Since the terrain condition in which the driverless vehicle 106 is moving is a highway and the driverless vehicle 106 is capable of proceeding forward on the highway the virtual ray tracing module 227 identifies the second originating point 235*b* as a subsequent navigation point i.e. second navigation point 236*b* (as shown in the FIG. 2H). Upon identifying the second navigation point 236*b*, the navigating module 228 may navigate the driverless vehicle 106 to the certain pre-configured forward distance of 0.5 meter. Meanwhile, a new pre-generated path is received along with new environment data 209 which is dynamically updated in the path generating system 107. Upon moving forward, point 235*c* is selected as a third originating point 235*c* in the new pre-generated path as shown in FIG. 2H.

Following the above virtual ray tracing procedure, consider the traced virtual rays hit a second obstacle 233*f* at a preconfigured angle of −25 degree and at a distance of 5 meter. The preconfigured alignment distance range corresponding to the preconfigured angle −25 degree may be 0 meter-4 meter. Since the second obstacle 233*f* is present beyond the preconfigured alignment distance range, the second obstacle 233*f* is not a threat for navigation of the driverless vehicle 106. Therefore, the virtual ray tracing module 227 may check if the driverless vehicle 106 is capable of proceeding forward along direction of the virtual rays based on the one or more vehicle parameters, the one or more vehicle capability characteristics and the terrain condition of the environment data 209. Since the terrain condition in which the driverless vehicle 106 is moving is a highway and the driverless vehicle 106 is capable of proceeding forward on the highway, the virtual ray tracing module 227 identifies the third originating point 235*c* as a subsequent navigation point i.e. third navigation point 236*e* and the driverless vehicle 106 moves forward.

Further, in a scenario where upon following the virtual ray tracing procedure and the realigning procedure for the third originating point 235*c*, if the driverless vehicle 106 could not escape a next obstacle, the retracting module 231 may be activated. The retracting module 231 may retract to the previous navigation point or further behind based on severity of the blockage and repeat the virtual ray tracing procedure and the realigning procedure until the next obstacle is escaped and a new navigation point is obtained.

Finally, the one or more navigation points are linked by the linking module 232 to obtain the safe navigation path. The safe navigation path is a path that enables the vehicle escape obstacles and experience minimum number of jerks or no jerks, uniform speed and good pick up.

Figure 3:
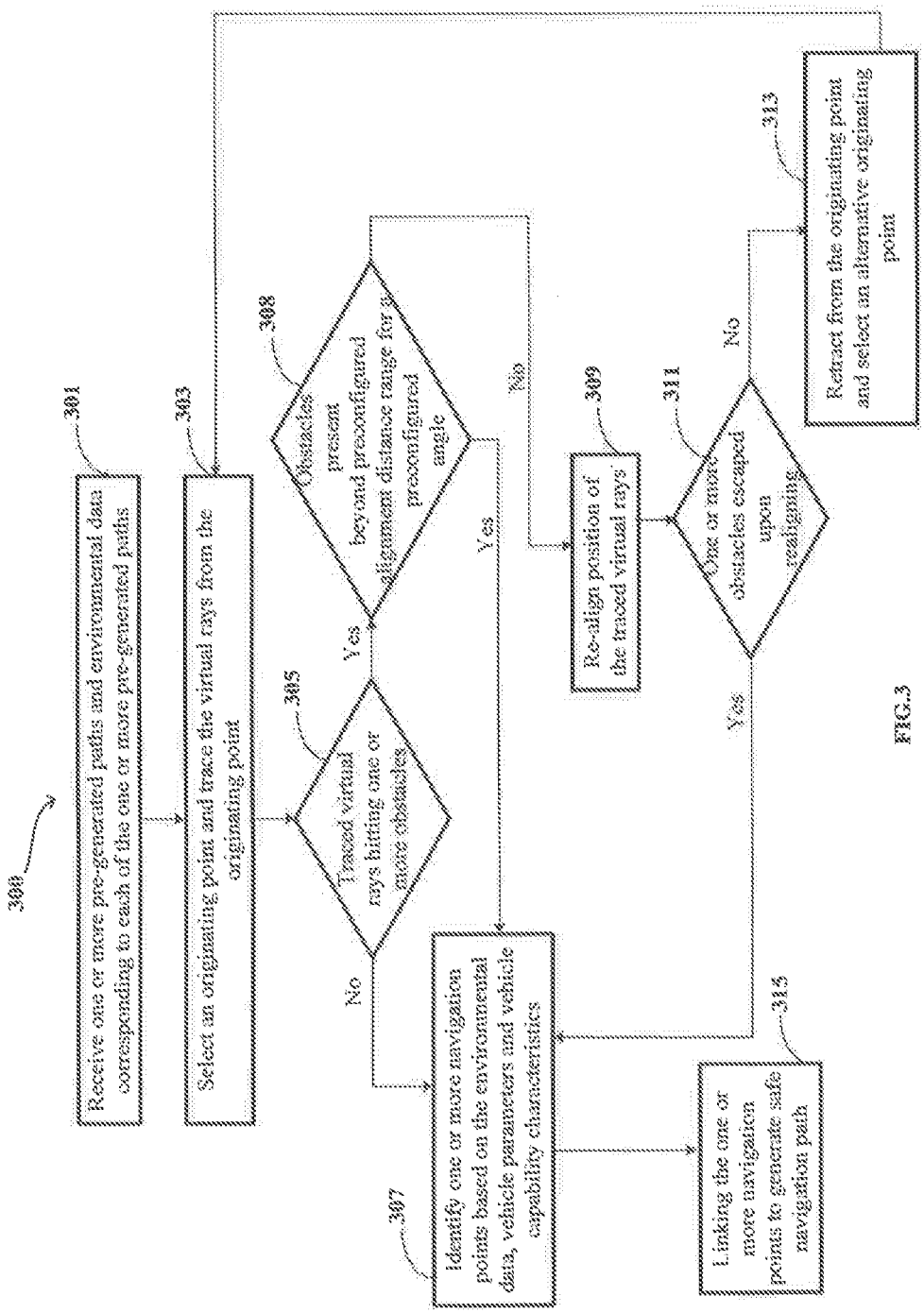
FIG. 3 shows a flowchart illustrating a method of generating a safe navigation path for navigating a driverless vehicle in accordance with some embodiments of the present disclosure.

FIG. 3 shows a flowchart illustrating a method of generating a safe navigation path for navigating a driverless vehicle in accordance with some embodiments of the present disclosure.

As illustrated in FIG. 3, the method 300 includes one or more blocks illustrating a method of generating a safe navigation path for navigating a driverless vehicle 106. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include receiving, by a processor 109 of the path generating system 107, one or more pre-generated paths between a source point and a destination point and an environmental data 209 corresponding to each of the one or more pre-generated map paths from one or more sources in real-time. In some embodiments, the source point and the destination point may be provided by a user associated with the path generating system 107.

At block 303, the method 300 may include selecting, by the processor 109, one or more originating points along each of the one or more pre-generated paths. Upon selecting the one or more originating points, the processor 109 may trace the virtual rays in a preconfigured angle range up to a preconfigured distance from each of one or more originating points along each of the one or more pre-generated paths.

At block 305, the processor 109 may check for a condition if the traced virtual rays are hitting one or more obstacles. If the traced virtual rays are not hitting the one or more obstacles, the method 300 may proceed to block 307 via "No". If the traced virtual rays are hitting one or more obstacles, the method 300 may proceed to condition block 308 via "Yes".

At block 307, the method 300 may include, identifying, by the processor 109, one or more navigation points from each of the one or more originating points based on the environmental data 209, one or more vehicle capability characteristics and one or more vehicle parameters. In some embodiments, the processor 109 may record values associated with the one or more vehicle parameters and the vehicle capability characteristics when the driverless vehicle 106 is initiated.

At block 308, the method 300 may include, checking for a condition if the one or more obstacles are present beyond a preconfigured alignment distance range for a corresponding preconfigured angle of the virtual ray. In some embodiments, the preconfigured alignment distance range is selected based on the one or more vehicle parameters and the one or more vehicle capability characteristics. The preconfigured angle is within the preconfigured angle range and the preconfigured alignment distance range is within the preconfigured distance. If the one or more obstacles are present beyond the preconfigured alignment distance range, the method 300 proceeds to block 307 via "Yes". If the one or more obstacles are not present beyond the preconfigured alignment distance range, the method 300 proceeds to block 309 via "No".

At block 309, the method 300 may include, realigning, by the processor 109, position of the virtual rays from the originating point in different angles.

At block 311, the method 300 may include checking for a condition if the driverless vehicle 106 could escape the one or more obstacles upon realigning. If the driverless vehicle 106 escapes the one or more obstacles upon realigning, the method 300 proceeds to block 307. If the driverless vehicle 106 does not escape the one or more obstacles upon realigning, the method 300 proceeds to block 313.

At block 313, the method 300 may include, retracting, by the processor 109, from the originating point and select an alternative originating point for tracing the virtual rays and revert to block 303.

At block 315, the method 300 may include, linking, by the processor 109, the one or more navigation points based on one or more predefined techniques to generate the safe navigation path for navigating the driverless vehicle 106. In some embodiments, linking the one or more navigation points may include generating interpolated points between consecutive navigation points.

Figure 4:
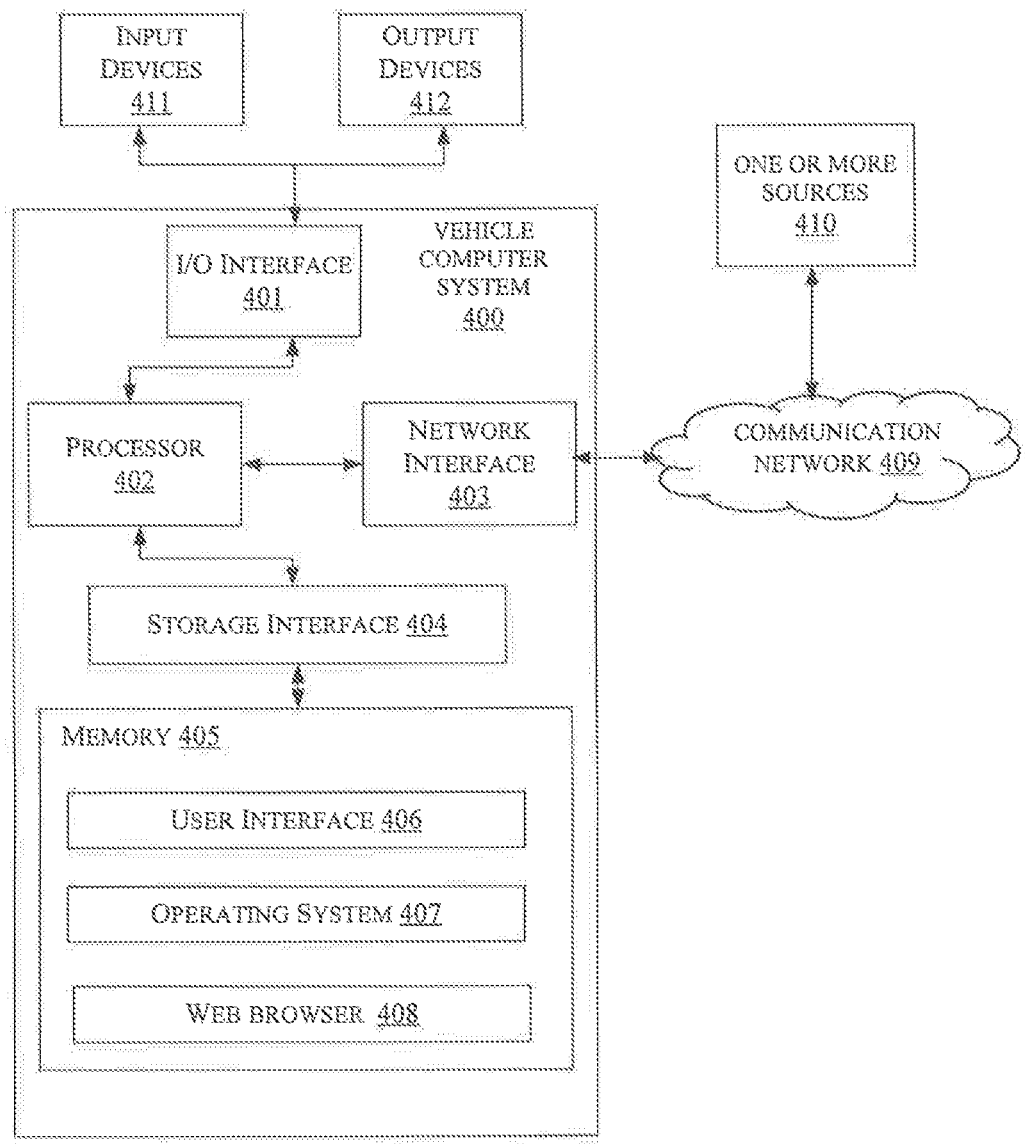
FIG. 4 is a block diagram of an exemplary vehicle computer system for implementing embodiments consistent with the present disclosure.

FIG. 4 is a block diagram of an exemplary vehicle computer system for implementing embodiments consistent with the present disclosure.

In an embodiment, FIG. 4 illustrates a block diagram of an exemplary vehicle computer system 400 for implementing embodiments consistent with the present invention. In an embodiment, the vehicle computer system 400 can be path generating system 107 that is used for generating a safe navigation path for navigating a driverless vehicle 106. The vehicle computer system 400 may include a central processing unit ("CPU" or "processor") 402. The processor 402 may include at least one data processor for executing program components for executing user or system-generated business processes. A user may include a person, a person using a device such as such as those included in this invention, or such a device itself. The processor 402 may include specialized processing units such as integrated system (bus) controllers, memory management control units, floating point units, graphics processing units, digital signal processing units, etc.

The processor 402 may be disposed in communication with one or more input/output (I/O) devices (411 and 412) via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, the vehicle computer system 400 may communicate with one or more I/O devices (411 and 412).

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/internet Protocol (TCP/IP), token ring, IEEE 802.11a/b/g/n/x, etc. Using the network interface 403 and the communication network 409, the vehicle computer system 400 may communicate with a with one or more sources 410 (410$_a$ up to 410$_n$). The communication network 409 can be implemented as one of the different types of networks, such as intranet or Local Area Network (LAN) and such within the organization. The communication network 409 may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. The one or more sources 410 may include, but not limited to, a navigation application, application related to maps, an image capturing device, a terrain detection system and a database. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the vehicle computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the vehicle computer system 400. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), International Business Machines (IBM) OS/2, Microsoft Windows (XP, Vista/7/8, etc.), Apple iOS, Google Android, Blackberry Operating System (OS), or the like. The User interface 406 may facilitate display, execution, interaction, manipulation, or operation of program components through textual or graphical facilities. For example, user interfaces may provide computer interaction interface elements on a display system operatively connected to the vehicle computer system 400, such as cursors, icons, check boxes, menus, scrollers, windows, widgets, etc. Graphical User Interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the vehicle computer system 400 may implement the web browser 408 stored program components. The web browser 408 may be a hypertext viewing application, such as Microsoft Internet Explorer, Google Chrome, Mozilla Firefox, Apple Safari, etc. Secure web browsing may be provided using Secure Hypertext Transfer Protocol (HTTPS) secure sockets layer (SSL), Transport Layer Security (TLS), etc. Web browsers may utilize facilities such as AJAX, DHTML, Adobe Flash, JavaScript, Java, Application Programming Interfaces (APIs), etc. In some embodiments, the vehicle computer system 400 may implement a mail server stored program component. The mail server may be an Internet mail server such as Microsoft Exchange, or the like. The mail server may utilize facilities such as Active Server Pages (ASP), ActiveX, American National Standards Institute (ANSI) C++/C#, Microsoft .NET, CGI scripts, Java, JavaScript, PERL, PHP, Python, WebObjects, etc. The mail server may utilize communication protocols such as Internet Message Access Protocol (IMAP), Messaging Application Programming Interface (MAPI), Microsoft Exchange, Post Office Protocol (POP), Simple Mail Transfer Protocol (SMTP), or the like. In some embodiments, the vehicle computer system 400 may implement a mail client stored program component. The mail client may be a mail viewing application, such as Apple Mail, Microsoft Entourage, Microsoft Outlook, Mozilla Thunderbird, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

Advantages of the embodiment of the present disclosure are illustrated herein.

In an embodiment, the present disclosure provides a method and a system for generating a safe navigation path for navigating a driverless vehicle.

The present disclosure provides a feature wherein the safe navigation path is generated considering vehicle parameters and vehicle capability characteristics such as a possible rate of change of steering angle at various speeds, turning radius, static inertia, dynamic inertia of the driverless vehicle and the like.

The present disclosure provides a feature wherein the safe navigation path is generated without the usage of any sensor configured in the autonomous vehicle/driverless vehicle.

A description of an embodiment with several components in communication with each other does not imply that all such components are required. On the contrary, a variety of optional components are described to illustrate the wide variety of possible embodiments of the invention.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for generating a safe navigation path for navigating a driverless vehicle. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open-ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the following claims.

| Referral numerals | |
|---|---|
| Reference Number | Description |
| 100 | Architecture |
| 103 | One or more sources |
| 106 | Driverless vehicle |
| 107 | Path generating system |
| 109 | Processor |
| 111 | I/O interface |
| 113 | Memory |
| 203 | Data |
| 205 | Modules |
| 207 | Path data |
| 209 | Environmental data |
| 211 | Vehicle parameters and characteristics data |
| 213 | Navigation points data |
| 219 | Other data |
| 223 | Vehicle parameter recording/replacing module |
| 225 | Receiving module |
| 227 | Virtual ray tracing module |
| 229 | Realigning module |
| 231 | Retracting module |
| 232 | Linking module |
| 241 | Other modules |
| 233a | Source point |
| 233b | Destination point |
| 233d | Virtual rectangular boundary |
| 233e | First Obstacle |
| 233f | Second obstacle |
| 235a | First originating point |
| 235b | Second originating point |
| 235c | Third originating point |
| 236a | First navigation point |
| 236b | Second navigation Point |

What is claimed is:

1. A method of generating a safe navigation path for navigating a driverless vehicle, the method comprising:
receiving, by a path generating system, one or more pre-generated paths between a source point and a destination point and an environmental data corresponding to each of the one or more pre-generated paths from one or more sources in real-time;
identifying, by the path generating system, one or more navigation points in real-time based on the environmental data and one or more vehicle capability characteristics and one or more vehicle parameters by tracing virtual rays in a preconfigured angle range up to a preconfigured distance from each of one or more originating points along each of the one or more pre-generated paths, wherein identifying the one or more navigation points comprises:
realigning position of the traced virtual rays from an originating point in different angles until the traced virtual rays escape one or more obstacles;
identifying the originating point as the navigation point and proceeding for at least one of a preconfigured forward distance or a dynamically generated forward distance to obtain subsequent originating points; and
performing steps of re-aligning and identifying for each of the obtained subsequent originating points until the destination point is reached; and
linking, by the path generating system, the one or more navigation points based on one or more predefined techniques to generate the safe navigation path for navigating the driverless vehicle.

2. The method as claimed in claim 1, wherein the environmental data comprises data related to terrain associated with each of the one or more pre-generated paths and the one or more obstacles associated with each of the one or more pre-generated paths.

3. The method as claimed in claim 1, wherein the position of the traced virtual rays are realigned when the one or more obstacles are present at a preconfigured angle of the traced virtual rays and in a corresponding preconfigured alignment distance range from the originating point, wherein the corresponding preconfigured alignment distance range is selected for each of the preconfigured angle based on the one or more vehicle parameters and the one or more vehicle capability characteristics.

4. The method as claimed in claim 3, wherein each of the preconfigured angle is within the preconfigured angle range and the preconfigured alignment distance range corresponding to the preconfigured angle is within the preconfigured distance.

5. The method as claimed in claim 1, wherein the different angles are at least one of preconfigured or dynamically generated.

6. The method as claimed in claim 1, further comprising: retracting, by the path generating system, from the originating point and selecting an alternative originating point, when the method fails to identify the one or more navigation points from the originating point.

7. The method as claimed in claim 1, wherein the one or more vehicle parameters comprises at least one of dimensions, mass, or wheel friction of the driverless vehicle.

8. The method as claimed in claim 1, wherein the one or more vehicle capability characteristics comprises at least one of a possible rate of change of steering angle at various speeds, turning radius, static inertia, or dynamic inertia of the driverless vehicle.

9. The method as claimed in claim 1, further comprising: recording, by the path generating system, values associated with the one or more vehicle parameters and values associated with the one or more vehicle capability characteristics when the driverless vehicle is initiated.

10. A path generating system for generating a safe navigation path for navigating a driverless vehicle, the path generating system comprising:
a processor; and
a memory communicatively coupled to the processor, wherein the memory stores processor-executable instructions, which, on execution, causes the processor to:
receive one or more pre-generated paths between a source point and a destination point and an environmental data corresponding to each of the one or more pre-generated paths from one or more sources in real-time;
identify one or more navigation points in real-time based on the environmental data and one or more vehicle capability characteristics and one or more vehicle parameters by tracing virtual rays in a preconfigured angle range up to a preconfigured distance from each of one or more originating points along each of the one or more pre-generated paths, wherein the processor-executable instructions causing the processor to identify the one or more navigation points further causes the processor to:

realign position of the traced virtual rays from an originating point in different angles until the traced virtual rays escape one or more obstacles;

identify the originating point as the navigation point and proceeding for at least one of a preconfigured forward distance or a dynamically generated forward distance to obtain subsequent originating points; and perform steps of re-aligning and identifying for each of the obtained subsequent originating points until the destination point is reached; and link the one or more navigation points based on one or more predefined techniques to generate the safe navigation path for navigating the driverless vehicle.

11. The path generating system as claimed in claim 10, wherein the environmental data comprises data related to terrain associated with each of the one or more pre-generated paths and the one or more obstacles associated with each of the one or more pre-generated paths.

12. The path generating system as claimed in claim 10, wherein the processor is configured to realign the position of the traced virtual rays when the one or more obstacles are present at a preconfigured angle of the traced virtual rays and in a corresponding preconfigured alignment distance range from the originating point, wherein the corresponding preconfigured alignment distance range is selected for each of the preconfigured angle based on the one or more vehicle parameters and the one or more vehicle capability characteristics.

13. The path generating system as claimed in claim 12, wherein each of the preconfigured angle is within the preconfigured angle range and the preconfigured alignment distance range corresponding to the preconfigured angle is within the preconfigured distance.

14. The path generating system as claimed in claim 10, wherein the different angles are at least one of preconfigured or dynamically generated.

15. The path generating system as claimed in claim 10, wherein the processor is further configured to retract from the originating point and select an alternative originating point, when the method fails to identify the one or more navigation points from the originating point.

16. The path generating system as claimed in claim 10, wherein the one or more vehicle parameters comprises at least one of dimensions, mass, or wheel friction of the driverless vehicle.

17. The path generating system as claimed in claim 10, wherein the one or more vehicle capability characteristics comprises at least one of a possible rate of change of steering angle at various speeds, turning radius, static inertia, or dynamic inertia of the driverless vehicle.

18. The path generating system as claimed in claim 10, wherein the processor is further configured to record values associated with the one or more vehicle parameters and values associated with the one or more vehicle capability characteristics when the driverless vehicle is initiated.

19. A non-transitory computer readable medium including instructions stored thereon that when processed by at least one processor causes a path generating system to perform operations comprising:

receiving one or more pre-generated paths between a source point and a destination point and an environmental data corresponding to each of the one or more pre-generated paths from one or more sources in real-time;

identifying one or more navigation points in real-time based on the environmental data and one or more vehicle capability characteristics and one or more vehicle parameters by tracing virtual rays in a preconfigured angle range up to a preconfigured distance from each of one or more originating points along each of the one or more pre-generated paths, wherein identifying the one or more navigation points comprises:

realigning position of the traced virtual rays from an originating point in different angles until the traced virtual rays escape one or more obstacles;

identifying the originating point as the navigation point and proceeding for at least one of a preconfigured forward distance or a dynamically generated forward distance to obtain subsequent originating points; and performing steps of re-aligning and identifying for each of the obtained subsequent originating points until the destination point is reached; and linking the one or more navigation points based on one or more predefined techniques to generate the safe navigation path for navigating the driverless vehicle.

* * * * *